June 30, 1931.  E. W. DAVIS  1,812,038
COUPLING
Original Filed March 18, 1926
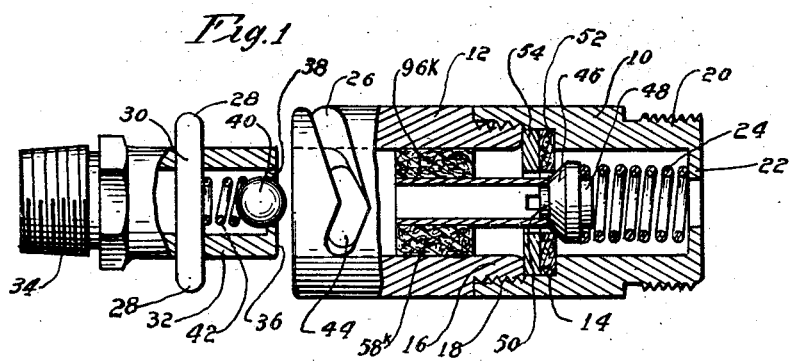
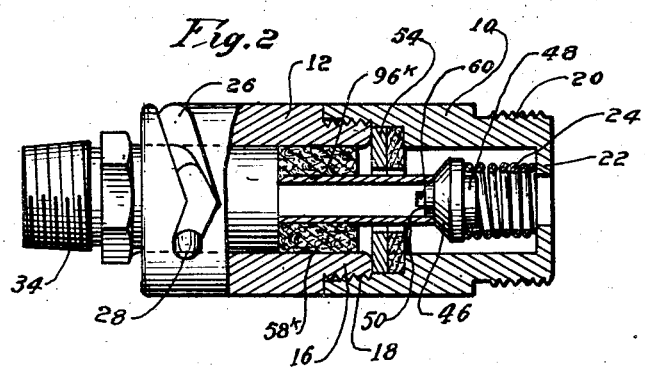
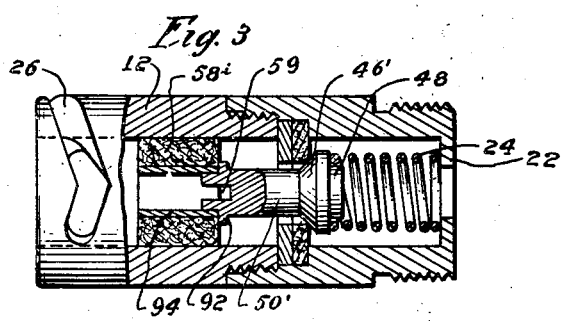
Inventor:
Ernest W. Davis
By: Williams, Bradbury,
McCaleb & Hinkle
Attys Patented June 30, 1931

1,812,038

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

COUPLING

Original application filed March 18, 1926, Serial No. 95,688. Divided and this application filed May 12, 1927. Serial No. 190,696.

My invention relates to lubrication and more specifically to an improved coupling for connecting the discharge tube, or opening, of a source of lubricant under pressure, to means fixed on the bearing, or machine element, to be lubricated, for receiving such lubricant under pressure.

This application is a division of my copending application, Serial No. 95,688, filed March 18, 1926, for couplings.

Among the objects and advantages of the invention may be enumerated:

First, the simplification and standardization of the constructional embodiment of the coupling;

Second, increased ease in replacement and maintenance; and

Third, greater certainty in operation.

The problem involved is unique on account of the small volumes to be handled, the relatively wide range and high upper limit of the pressures to be carried, and the unusually objectionable features, from a service standpoint, of even a very slight leakage. Thus, a relatively small quantity of lubricant is all that need be injected at each lubrication into an ordinary bearing, and a moderate pressure is often sufficient, but the equipment employed is usually capable of generating relatively high pressures of the order of magnitude of one thousand pounds per square inch or more, for forcing the lubricant positively into places clogged with dirt or old lubricant, and such high pressures are required at frequent intervals in service. Furthermore, a very slight leak soon soils the parts and destroys one of the main advantages rendering lubricating systems of the type involved superior to ordinary grease cups, viz. cleanliness.

In the accompanying drawings:

Figure 1 is a central section through a complete coupling showing the two coupling members in separated relation;

Figure 2 is a similar section showing the two coupling members in coupled relation; and Figure 3 is a central section through a modified form of female coupling member.

In the embodiments shown, the female coupling member comprises two sleeves, a rear, or inlet, sleeve 10 and a front, or discharge, sleeve 12. The two sleeves are of smooth, uniform outer configuration and identical diameter, so that they appear in use as a single element. On the inside, one of the sleeves is enlarged as at 14 to form a shoulder, and the threaded end 16 on the other sleeve engages the threads 18 in the first sleeve to fasten the parts together. The channel thus formed between the end portion 16 and the opposing shoulder receives and clamps in place a suitable seat for the valve.

The rear sleeve is threaded at 20 for attachment to the discharge opening of a grease gun, or the end of a suitable conduit for conveying lubricant under pressure into the coupling. Its rear end is also provided with an inwardly extending flange 22 forming a seat for the valve spring 24.

The front sleeve is provided with a pair of bayonet slots 26 for receiving the projecting ends 28 of a pin 30 passing transversely through the tubular body 32 of a male coupling member, commonly referred to by the trade as a fitting. The fitting has a threaded tubular end portion 34 for attaching the same to a bearing, or the like, a smooth contact face 36 at its receiving end for forming a lubricant seal, and a shoulder at 38 forming a valve seat. The ball check valve 40 is held against the seat 38 by a suitable spring 42.

The slots 26 have been illustrated in this instance with a return pocket, or reversely inclined inner end portion 44, tending to retain the parts in coupled position.

In the embodiment of the invention selected for illustration in Figure 1, the valve comprises a valve member proper 46, carrying a stud 48 for centering the spring 24, and having a studded stem 50 for a purpose to be hereinafter described. The valve proper 46 seats on an annular ring 52 of leather, fibre, or other material suitable for forming a tight seal, reinforced by a metal ring 54, both clamped in place by assembling the front and rear sleeves.

The sealing means for effecting a lubricant tight seal with the face 36 of the fitting comprises a cork friction cylinder 58k jammed snugly into the bore of the front sleeve and having a snug friction fit therein. The reinforcing sleeve 96k extends entirely through the cork cylinder 58k and fits loosely on the end of the valve stem 50. I have found that a cork member of this sort will maintain snug frictional engagement and stay in place quite nicely without the provision of any means for preventing it from slipping out of the end of the sleeve 12. When, after a very long period of service, it happens to work loose, it can be withdrawn and a new tight-fitting one slipped in place without separating the sleeves.

When a lubricant receiving fitting is drawn into the end of the female coupling member by the interaction of the slots on the coupling member and the pin of the fitting, an initial seal between the coupling member and the fitting is effected by the spring 24 acting through the valve 46, sleeve 96k and cork cylinder 58k. As soon as the valve 46 has been moved from its seat by the inward movement of the fitting, this initial seal is reinforced by the pressure of the lubricant acting on the inner end of the cork cylinder and serving to press it more tightly against the end of the fitting. Communication between the bore of the fitting and the interior of the sleeve 10 is established through the axial opening in the sleeve 96k and cross passages 60 therein.

It will be apparent that the assembled female coupling member is a self-contained, unitary structure of convenient and serviceable shape and so designed as to provide maximum facility in replacing a worn or defective sealing member. It should also be noted that disconnecting the front and rear sleeves by unscrewing them, will let the metal ring 54, the valve seat 52, the valve 46, and the valve spring 24, all fall apart into as many separate pieces. Thus, any or all of the parts, which may have been worn by usage, or damaged by the insertion into the coupling member of tools not intended for such use, may readily be replaced, or repaired, and all the "insides" stacked together again and reassembled by threading the sleeves together.

The embodiment illustrated in Figure 3 is identical with that disclosed in Figures 1 and 2 except that in this instance the valve proper 46' is provided with a longer valve stem 50' having a shoulder 92 adjacent its outer end which serves as an abutment for the cork cylinder 58i and its reinforcing sleeve 94. In this embodiment the valve stem 50' is provided with a passage 59 for establishing communication between the interior of the sleeve 94 and the interior of the sleeve 12.

Having thus illustrated and described preferred embodiments of my invention, what I claim and desire to secure by United States Letters Patent is:

1. A lubricant coupling member comprising a sleeve having an inlet end and an outlet end, a check valve element intermediate said ends, a seat for said valve, a spring housed in said inlet end for pressing said valve toward its seat, a sealing element comprising a cork cylinder compressed into and having a friction fit in the outlet end of said sleeve, a stem carried by one of said elements and having contact engagement with the other, and bayonet slot means for telescoping said sleeve over a lubricant receiving fitting to form a seal and to push said valve open, said sealing element being removable through the open outlet end of said sleeve.

2. A lubricant coupling member comprising a sleeve having an inlet end and an outlet end, a check valve element intermediate said ends, a seat for said valve, a spring pressing said valve toward its seat, a sealing element comprising a cork cylinder compressed into and having a friction fit in the outlet end of said sleeve, and a stem carried by one of said elements and having contact engagement with the other.

3. A lubricant coupling member comprising aligned inlet and outlet sleeves, one end of one of said sleeves being cut down and externally threaded, the juxtaposed end of the other sleeve being enlarged and internally threaded, the length of the cut down end being less than the length of the enlarged end, a valve seat clamped in the annular orifice thus formed when said sleeves are assembled, a lubricant receiving fitting, a bayonet joint connection between said outlet sleeve and said fitting, an outwardly opening check valve on said seat, a spring in said inlet sleeve for holding said check valve closed, a valve stem extending from said valve outwardly along the axis of said outlet sleeve, a sealing gasket at the outer end of said valve stem, said gasket, stem and valve having abutment to transmit a thrust from the end of said fitting to said valve for opening said valve against the action of the spring, said stem and valve being freely separable when said sleeves are separated.

4. A lubricant coupling member comprising a sleeve having an inlet end and an outlet end, a check valve element intermediate said ends, a seat for said valve, a sealing element in the outlet end of said sleeve, a tubular stem carried by said sealing element and extending back into contact with said valve, said tubular stem comprising a separate element, said sealing element and stem being removable through the open outlet end of said sleeve.

5. In high pressure lubricating apparatus of the class described, a lubricant coupling member comprising a sleeve having an inlet end and an outlet end and a passage connecting said ends, said passage having an unobstructed outlet end portion, a sealing element comprising a cork cylinder compressed into and having a friction fit in said unobstructed portion, said sealing element being removable through the outlet end of said sleeve, and a reinforcing tubular member within said sealing element and extending substantially the entire length thereof.

6. A lubricant coupling member comprising a sleeve having an inlet end and an outlet end and a passage connecting said ends, a sealing element comprising a cork cylinder compressed into and having a friction fit in the outlet end of said sleeve, and a tubular member extending axially through said cylinder.

7. In high pressure lubricating apparatus of the class described, a coupling member having a passage therethrough including inlet and outlet ends, said passage having an unobstructed portion adjacent its outlet end, a sealing member comprising a cork cylinder reciprocable in the unobstructed portion of said passage, and a tubular member extending axially of said cylinder and serving to maintain the periphery of said cylinder in contact with the wall of said passage, said cylinder and tubular member being removable through the outlet end of said passage.

8. In lubricating apparatus of the class described, a coupling member comprising a sleeve having an inlet end and an unobstructed outlet end, a check valve element intermediate said ends, a seat for said valve, a sealing element in the outlet end of said sleeve, a tubular stem carried by said sealing element and slidably engaging a part of said valve element, said sealing element and tubular stem being removable through the outlet end of said sleeve.

9. A lubricant coupling member comprising a sleeve having an inlet end and an outlet end, a check valve element intermediate said ends, a seat for said valve, a spring housed in said inlet end for pressing said valve toward its seat, a projection carried by said valve and extending through said seat, a sealing element in the outlet end of said sleeve, a tubular stem carried by said sealing element and extending back into sliding engagement with said projection, whereby said tubular element and said sealing member are movable independently of said valve, and bayonet slot means in the outlet end of said sleeve for telescoping said sleeve over a receiving fitting to establish a seal with said sealing member and push said valve open, said stem having a lateral opening between said valve and said sealing member to complete a passage through to said fitting when said valve is open.

In witness whereof, I hereunto subscribe my name this 9th day of May, 1927.

ERNEST W. DAVIS.